US009150079B2

(12) United States Patent
Jung et al.

(10) Patent No.: US 9,150,079 B2
(45) Date of Patent: Oct. 6, 2015

(54) COUPLED TORSION BEAM AXLE TYPE SUSPENSION SYSTEM

(71) Applicant: Hyundai Motor Company, Seoul (KR)

(72) Inventors: Jin-Ho Jung, Hwaseong-si (KR); Seon Pyung Kim, Seoul (KR); Youn Hyung Cho, Seoul (KR); Jaekil Lee, Suwon-si (KR); Seong Hee Jeong, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/473,567

(22) Filed: Aug. 29, 2014

(65) Prior Publication Data

US 2015/0123369 A1 May 7, 2015

(30) Foreign Application Priority Data

Nov. 4, 2013 (KR) ........................ 10-2013-0132957

(51) Int. Cl.
*B60G 21/05* (2006.01)

(52) U.S. Cl.
CPC .......... *B60G 21/052* (2013.01); *B60G 2200/31* (2013.01)

(58) Field of Classification Search
CPC .... B60G 21/05; B60G 21/051; B60G 21/052; B60G 220/31
See application file for complete search history.

(56) References Cited

U.S. PATENT DOCUMENTS 3,215,384 A * 11/1965 Chambers ........................ 403/98
4,165,099 A * 8/1979 Wagner et al. ......... 280/124.116
4,709,935 A * 12/1987 Takizawa et al. ............. 180/414
5,683,098 A * 11/1997 VanDenberg .......... 280/124.116
6,173,977 B1 * 1/2001 Fun ........................ 280/124.116
6,267,397 B1 * 7/2001 Hamada et al. ........ 280/124.128
2009/0066153 A1 * 3/2009 Bitz et al. ...................... 301/131
2011/0031712 A1 * 2/2011 Bitz et al. ............... 280/124.106
2013/0270789 A1 * 10/2013 Fowler et al. .......... 280/124.116

FOREIGN PATENT DOCUMENTS

JP 2001-39136 A 2/2001
JP 2013-52855 A 3/2013
KR 10-0882667 B1 2/2009

* cited by examiner

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

A coupled torsion beam axle type suspension system may includes trailing arms respectively coupled to opposite ends of a torsion beam, and vehicle body-engaging units, each provided in a front end portion of a respective trailing arm and engaging the respective trailing arm to a vehicle body. Each vehicle body-engaging unit may include a trailing arm bush, a mounting link, a rotation mounting bush, an upper mounting bush, an adapter, and a stay.

16 Claims, 5 Drawing Sheets

Turning direction
15 33 S1 35 41 31 21 S2 5 1 9 3 F1 WC L2 L1 SP W1 W2

(A)
35
31a
21
1
5
31
33
(B)
41a
41
35
21
1
5
31
33
(C)
35
60
41
5
21
31
33
H
(D)
60
41
31
5
21
B
33
51
(E)
41
60
35
B
5
21
31
33
51

COUPLED TORSION BEAM AXLE TYPE SUSPENSION SYSTEM

CROSS-REFERENCE TO RELATED APPLICATION

The present application claims priority of Korean Patent Application Number 10-2013-0132957 filed on Nov. 4, 2013, the entire contents of which application are incorporated herein for all purposes by this reference.

BACKGROUND OF INVENTION

1. Field of Invention

The present invention relates to a coupled torsion beam axle type suspension system, and more particularly, to a coupled torsion beam axle type suspension system for controlling movement (e.g., toe) characteristics thereof with respect to a side force, when a vehicle turns.

2. Description of Related Art

Generally, despite a limitation in design performance factors such as ride comfort, driving stability, etc., a coupled torsion beam axle type suspension system (hereinafter referred to as a CTBA) has been primarily applied to rear wheel suspension systems for compact and mid-size cars, compared with independent-type suspension systems, because they have advantages of light weight and low production cost due to their simpler components.

FIG. 1 is a perspective view of a CTBA according to one example of the related art. Referring to FIG. 1, the CTBA according to one example of the related art is provided with a torsion beam 1 in a width direction of a vehicle, trailing arms 5 respectively coupled to opposite ends of the torsion beam 1, and carriers 3 for mounting wheel tires at the trailing arms 5. A spring seat 9 for mounting a spring 7 thereon and a shock absorber pin 13 for coupling with a shock absorber 11 are provided at a rear inner portion of the trailing arm 5.

In addition, a vehicle body-engaging unit 15 is provided at a front end portion of the trailing arm 5 to be coupled to a vehicle body. Each vehicle body-engaging unit 15 includes a trailing arm bush 21 that is coupled to the front end portion of the trailing arm 5, and a mounting bracket 23 that is coupled to the trailing arm bush 21 through a bolt 25.

According to the CTBA having the aforementioned configuration, wheels are deformed due to twisting deformation characteristics of the torsion beam 1, and in addition to that, positions of the trailing arm 5 and a configuration of the vehicle body-engaging unit 15 cause deformation of the wheels.

The vehicle should maintain an under-steering tendency in consideration of driving stability when it turns, and for this purpose, it is ideal that a rear outer wheel of a turning vehicle (hereinafter referred to as a rear outer wheel) should be induced to toe-in and a rear inner wheel of the turning vehicle (hereinafter referred to as a rear inner wheel) should be induced to toe-out.

However, the entire CTBA rotates by the deformation of the trailing arm bush 21 and generates a toe angle at the rear outer wheel. That is, when the vehicle turns, the bumped rear outer wheel is applied with the side force and thus is likely to be induced to toe-out, while the rebounded rear inner wheel is applied with the side force and thus is likely to maintain the previous toe angle or to be induced to toe-in, such that the vehicle is over-steered in general and thus causes deterioration of turning stability.

As a mechanical instantaneous rotational center point of the CTBA with respect to the vehicle body (i.e., an intersection of lines that extend in engaging directions of the trailing arm bushes 21 engaged to the vehicle body) is positioned in front of the wheel centers, the rear outer wheel has a tendency to toe-out due to the side force while the rear inner wheel has a tendency to toe-in due to the side force.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

A coupled torsion beam axle type suspension system (CTBA) according various aspects of the present invention may include: trailing arms respectively coupled to opposite ends of a torsion beam, and vehicle body-engaging units, each provided in a front end portion of a respective trailing arm and engaging the respective trailing arm to a vehicle body. Each vehicle body-engaging unit may include: a trailing arm bush that is coupled to a front end portion of the respective trailing arm; a mounting link disposed in front of the trailing arm bush and engaged thereto in a width direction of a vehicle; a rotation mounting bush disposed in front of and outside of the respective trailing arm in the width direction of the vehicle, engaged to a front end of the mounting link, and engaged with a lower part of the vehicle body in a height direction of the vehicle; an upper mounting bush connected to a protrude portion protruded from the mounting link between the rotation mounting bush and the respective trailing arm; an adapter where the upper mounting bush is inserted therein and engaged to the lower part of the vehicle body; and a stay engaged to the rotation mounting bush through a bush bolt under the rotation mounting bush and connected to the vehicle body.

A first pocket portion may be formed to a rearward of the mounting link for the trailing arm bush to be inserted and to be engaged therein. An intersection of extending lines that pass centers of the rotation mounting bushes and the trailing arm bushes may form an instantaneous rotational center point of the CTBA, and the instantaneous rotational center point of the CTBA may be positioned behind wheel centers. The vehicle body may be a side member.

A second pocket portion may be formed to the adapter for the upper mounting bush to be inserted and to be engaged therein. The second pocket portion of the adapter may be protruded upward, and the upper mounting bush may be disposed within the vehicle body and is supported by the adapter.

The rotation mounting bush may be disposed between the stay and the vehicle body.

A coupled torsion beam axle type suspension system (CTBA) according to various other aspects of the present invention may include: trailing arms respectively coupled to opposite ends of a torsion beam; and vehicle body-engaging units, each provided in a front end portion of a respective trailing arm and engaging the respective trailing arm to a vehicle body. Each vehicle body-engaging unit may include: a trailing arm bush that is coupled to a front end portion of the respective trailing arm; a mounting link where a first pocket portion is formed to a rearward thereof for the trailing arm bush to be inserted and to be engaged therein, an upper mounting bush connected to a protrude portion protruded therefrom, and a rotation mounting bush disposed in front and outside thereof in a width direction of the vehicle; an adapter where the upper mounting bush is inserted therein and engaged to a lower part of the vehicle body through the upper mounting bush in the width direction of the vehicle body; and a stay engaged to the rotation mounting bush through a bush bolt under the rotation mounting bush and connected to the vehicle body.

The mounting link may be engaged to the trailing arm bush through the first pocket portion in the width direction of the vehicle. The rotation mounting bush may be engaged with the lower part of the vehicle body in a height direction of the vehicle. The upper mounting bush may be disposed within the vehicle body and may be engaged with the vehicle body in the width direction of the vehicle.

An intersection of extending lines that pass centers of the rotation mounting bushes and the trailing arm bushes may form an instantaneous rotational center point of the CTBA, and the instantaneous rotational center point of the CTBA may be positioned behind wheel centers. The vehicle body may be a side member.

A second pocket portion may be formed to the adapter for the upper mounting bush to be inserted and to be engaged therein. The second pocket portion of the adapter may be protruded upward, and the upper mounting bush may be disposed within the vehicle body and may be supported by the adapter.

The rotation mounting bush may be disposed between the stay and the vehicle body.

According to various aspects of the present invention, as the mounting link is applied and the instantaneous rotational center point with respect to the vehicle body is positioned behind wheel centers, the outer rear wheel is induced to toe-in and the inner rear wheel is induced to toe-out by the side force when the vehicle turns, thereby securing the turning stability.

Since the adapter for mounting the upper mounting bush is applied to the CTBA, and the CTBA and the mounting link is assembled to a vehicle body as a suspension module in manufacturing line, assemble process may be simplified, and the strengths of the side member for mounting the upper mounting bush may be enhanced.

According to various aspects of the present invention, the stay for mounting the rotation mounting bush may enhance mounting portion of the rotation mounting bush where particularly strength is required.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 5A-5E, is a drawing showing assembling process of an exemplary coupled torsion beam axle type suspension system according to the present invention.

DETAILED DESCRIPTION

Figure 1:
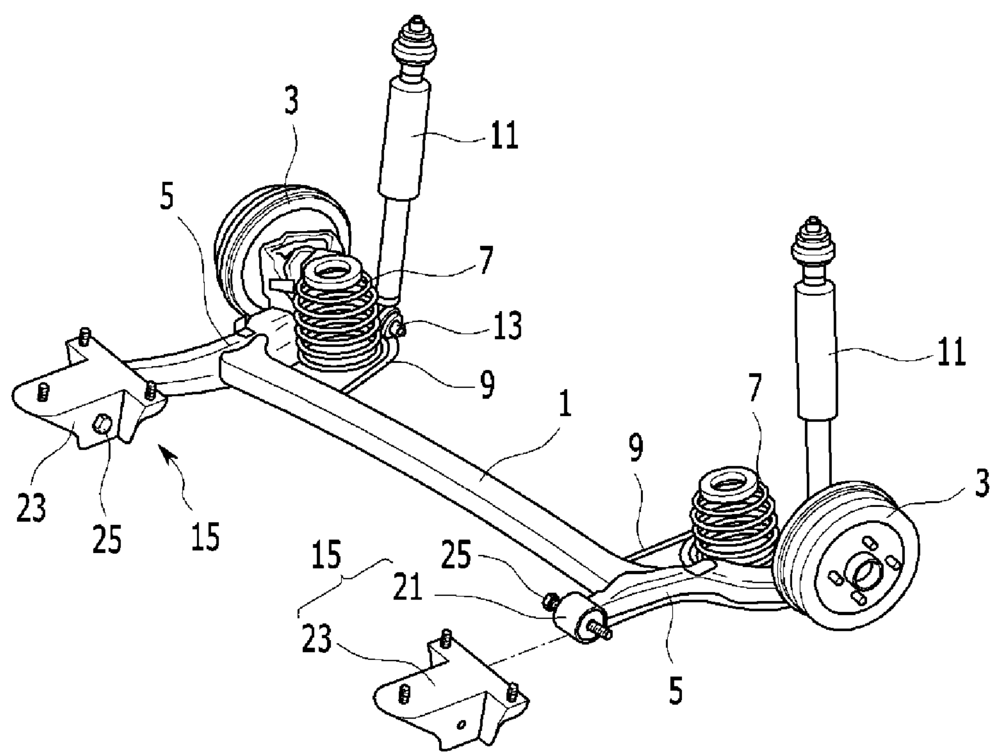
FIG. 1 is a perspective view of a coupled torsion beam axle type suspension system according to one example of the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The size and thickness of each component illustrated in the drawings are shown for ease of description and the present invention is not limited thereto, and the thicknesses of portions and regions are exaggerated for clarity. In addition, parts that are irrelevant to the description are omitted to clearly describe the exemplary embodiments of the present invention, and like reference numerals designate like elements throughout the specification, which also applies to the related art. Throughout the specification and the claims, unless explicitly described to the contrary, the word “comprise” and variations such as “comprises” or “comprising”, will be understood to imply the inclusion of stated elements but not the exclusion of any other elements.

Figure 2:
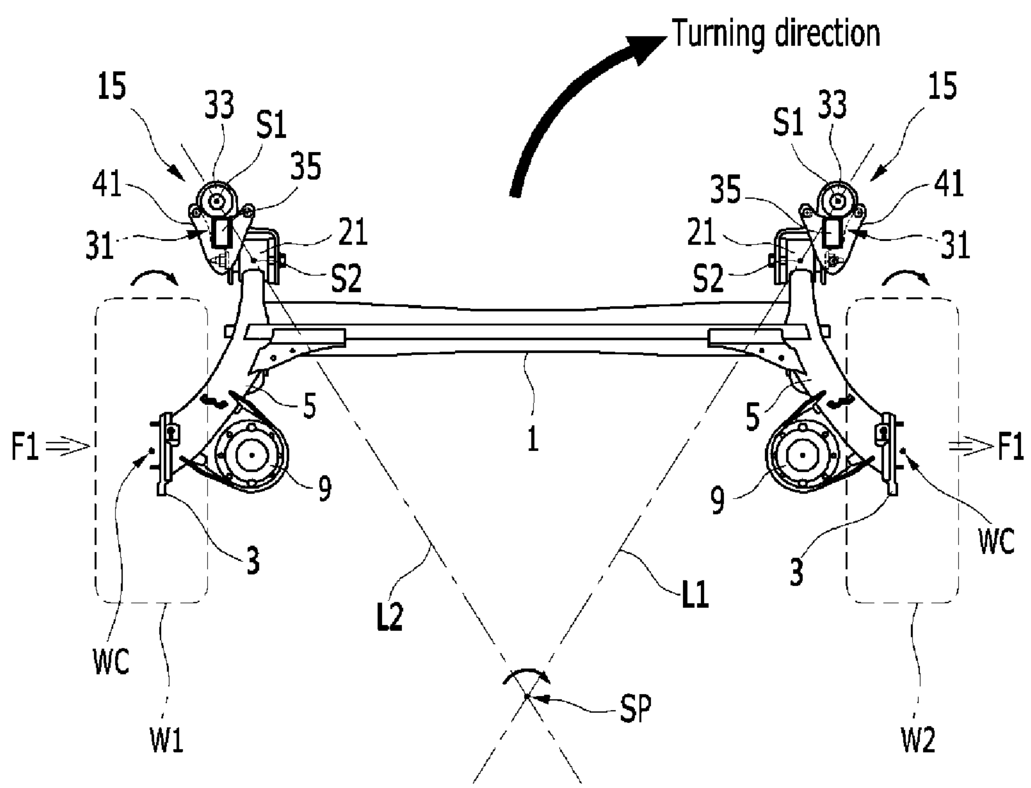
FIG. 2 is a top plan view of an exemplary coupled torsion beam axle type suspension system according to the present invention.
Figure 3:
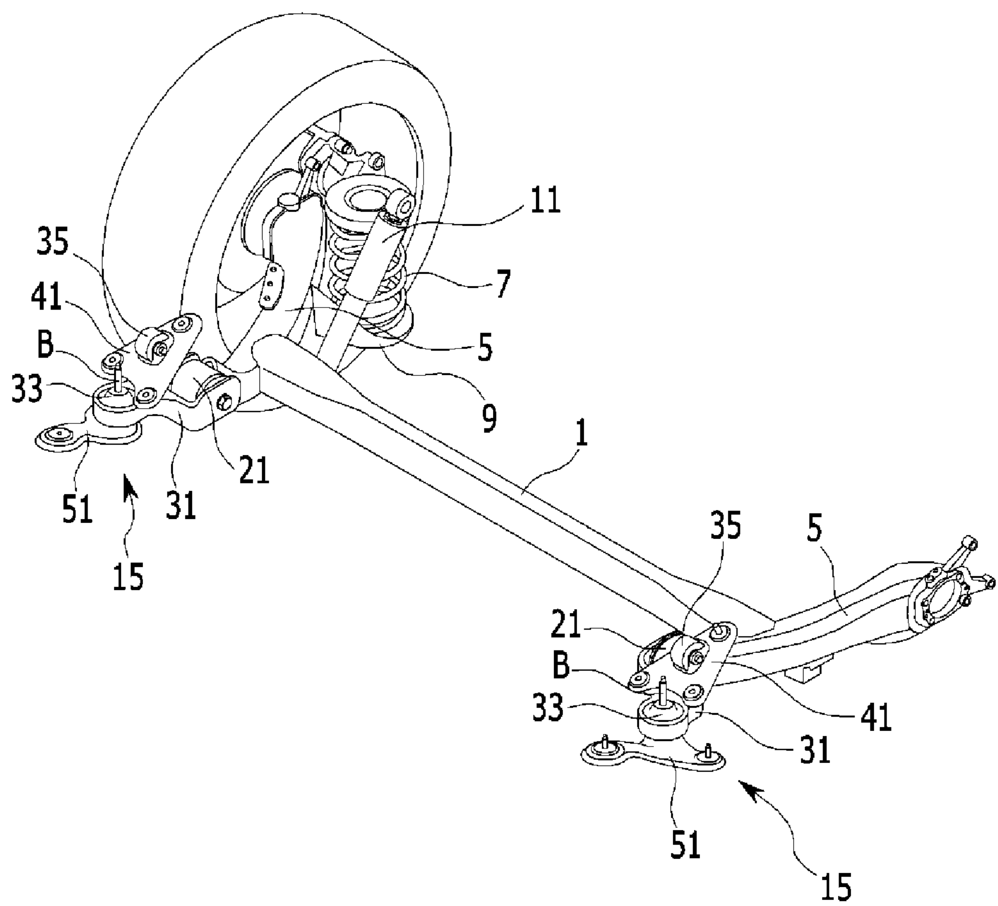
FIG. 3 is perspective view of an exemplary coupled torsion beam axle type suspension system according to the present invention.
Figure 4:
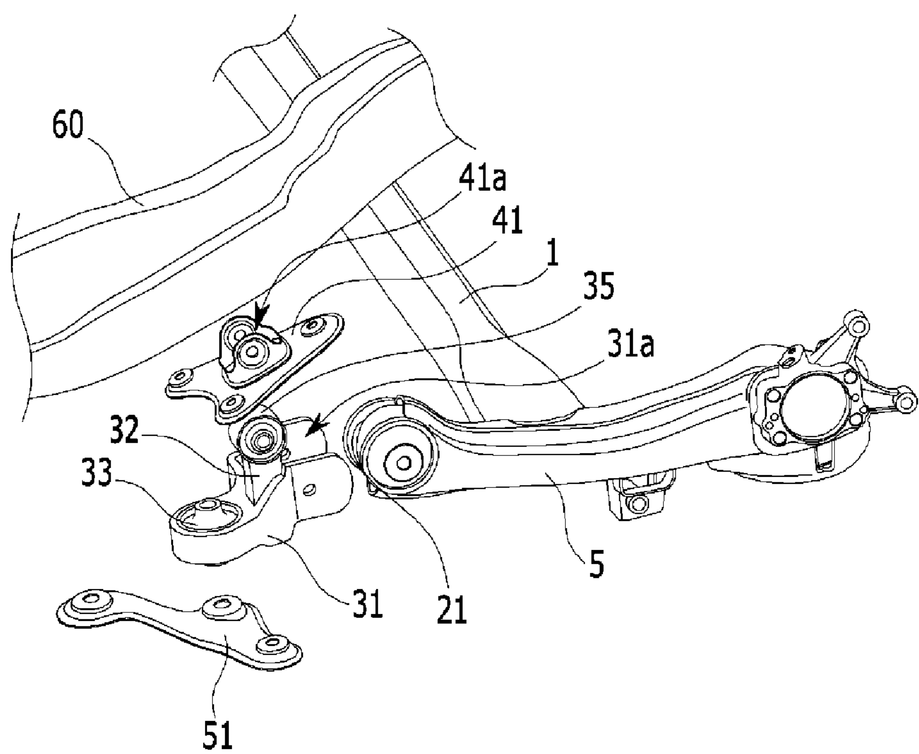
FIG. 4 is a partial exploded perspective view of an exemplary coupled torsion beam axle type suspension system according to the present invention.

FIG. 2 is a top plan view of a coupled torsion beam axle type suspension system according to various embodiments of the present invention, and FIG. 3 is perspective view of a coupled torsion beam axle type suspension system according to various embodiments of the present invention. FIG. 4 is a partial exploded perspective view of a coupled torsion beam axle type suspension system according to various embodiments of the present invention, and FIG. 5, including FIGS. 5A-5E, is a drawing showing assembling process of a coupled torsion beam axle type suspension system according to various embodiments of the present invention.

Referring to FIG. 2 to FIG. 4, a coupled torsion beam axle type suspension system (hereinafter referred to as a CTBA) according to various embodiments of the present invention is provided with a torsion beam 1 in a width direction of a vehicle, and trailing arms 5 respectively fixed to the opposite ends of the torsion beam 1 that are provided with mounting carriers 3.

A spring seat 9 for mounting a spring 7 thereon and a shock absorber pin 13 (the same or similar to 13 of FIG. 1) for coupling with a shock absorber 11 are provided at a rear inner portion of the trailing arm 5. In addition, a vehicle body-engaging unit 15 is provided at a front end portion of the trailing arm 5 to be coupled to a vehicle body.

In various embodiments of the present invention, the vehicle body-engaging unit 15 includes a trailing arm bush 21, a mounting link 31, a rotation mounting bush 33, an upper mounting bush 35, an adapter 41 and a stay 51. The trailing arm bush 21 is coupled to a front end portion of the trailing arm 5. The mounting link 31 is disposed in front of the trailing arm bush 21 and engaged thereto in a width direction of a vehicle.

Referring to FIG. 4, a pocket portion 31*a* is formed to a rearward of the mounting link 31 for the trailing arm bush 21 to be inserted and to be engaged therein. A protrude portion 32 is protruded upward from the mounting link 31, the upper mounting bush 35 is connected to the protrude portion 32 with a predetermined height, and the rotation mounting bush 33 is connected to a front of and outside of the upper mounting bush 35.

The rotation mounting bush 33 is disposed in front of and outside of the trailing arm 21 in the width direction of the vehicle, engaged to a front end of the mounting link 31, and engaged with a lower part of the vehicle body 50, for example a side member (referring to 60 of FIG. 5), in a height direction of the vehicle 50.

The upper mounting bush 35 is connected on the mounting link 31 with a predetermined height between the rotation mounting bush 33 and the pocket portion 31*a* where the trailing arm bush 21 is mounted thereto, and is disposed within the vehicle body 50 and is engaged with the vehicle body 50, for example a side member (referring to 60 of FIG. 5), in the width direction of the vehicle.

Referring to FIG. 2, an intersection of extending lines L1 and L2 that pass centers S1 and S2 of the rotation mounting bushes 33 and the trailing arm bushes 21 forms an instantaneous rotational center point SP of the CTBA, and the instantaneous rotational center point SP of the CTBA is positioned behind wheel centers WC.

Referring to FIG. 3 and FIG. 4, the upper mounting bush 35 is inserted into the adapter 41 and engaged thereto in width direction of a vehicle, and the adapter 41 is engaged to a lower portion of the side member 60.

A pocket portion 41*a* is formed to the adapter 41, the upper mounting bush 35 is inserted into the pocket portion 41*a*, and the adapter 41 is engaged to a lower portion of the side member 60 in width direction of a vehicle.

The adapter 41 is engaged to the lower portion of the side member 60 such as with 3 connection points, and the pocket portion 41*a* of the adapter 41 is protruded from the adapter 41. And the upper mounting bush 35 inserted into the pocket portion 41*a* is disposed within the side member 60 and is supported by the adapter 41.

The stay 51 is engaged to the rotation mounting bush 33 through a bush bolt B under the rotation mounting bush 33 and is connected to the lower portion of the side member 60. And the stay 51 forms additional engaging portions for engaging with the side member 60. That is, the additional engaging portions of the stay 51 may be engaged with the side member 60 such as with 2 connection points at front end and at outside end thereof for enhancing strength.

In various embodiments of the present invention, as shown in FIG. 2, since the upper mounting bush 35, engaged with the lower portion of the side member 60, and the rotation mounting bush 33 are applied to the mounting link 31 engaged with the trailing arm bush 21, and thus strength of the suspension system may be enhanced.

In various embodiments of the present invention, the instantaneous rotational center point SP of the CTBA is set such that it is positioned behind the wheel centers WC. That is, the mounting link 31 is engaged with the trailing arm bush 21 at the rear portion thereof in the width direction of a vehicle, is engaged with the rotation mounting bush 33, which has rotational degree of freedom with respect to the vehicle body 50, at the front portion thereof, is provided with the upper mounting bush 35 which has torsional rigidity against rotating direction, and the mounting link 31 is engaged with the lower portion of the vehicle body.

The rotation mounting bush 33 is positioned in front of and outside of the trailing arm bush 21 in the width direction of a vehicle, is engaged with the mounting link 31, and is engaged with the lower part of the vehicle body in a height direction of the vehicle body 50. And the upper mounting bush 35 is connected to the protrude portion 32 protruded from the mounting link 31 between the rotation mounting bush 33 and the trailing arm bush 33, and the upper mounting bush 35 is engaged with the vehicle body 50 in the width direction of a vehicle.

The instantaneous rotational center point SP of the CTBA is formed by the intersection of extending lines L1 and L2 that pass centers S1 and S2 of the rotation mounting bushes 33 and the trailing arm bushes 21, and the instantaneous rotational center point SP of the CTBA is positioned behind the wheel centers WC.

Accordingly, in the CTBA according to various embodiments of the present invention, the both mounting links 31 form a four-node link apparatus between the trailing arms 5 and the vehicle body, in which the centers S1 and S2 of the rotation mounting bushes 33 and the trailing arm bushes 21 are used as pivot points.

Thus, in the CTBA, when rear wheels are applied with the side force F1, such as when the vehicle turns, the rear outer wheel W1 that is rotated and bumped based on the instantaneous rotational center point SP, is induced to toe-in while the rebounded rear outer turning wheel W2 maintains a set toe angle or is induced to toe-out, such that the vehicle is generally under-steered to secure the turning stability.

Further, in the CTBA according to various embodiments of the present invention, the strength of the trailing arm bush 21 and the strength of the rotation mounting bush 33 are connected in series to improve impact characteristics against the thrust and drag forces, and the strength the rotation mounting bush 33 and the strength of the upper mounting bush 35 are connected in parallel to improve distortion strength (torsional rigidity), thereby improving movement characteristics against the side force F1 and roll characteristics.

In addition, the strength member including the rotation mounting bush 33 and the upper mounting bush 35 is additionally provided and thus a vibration property such as noise, vibration, and harshness (NVH) is improved.

Figure 5:
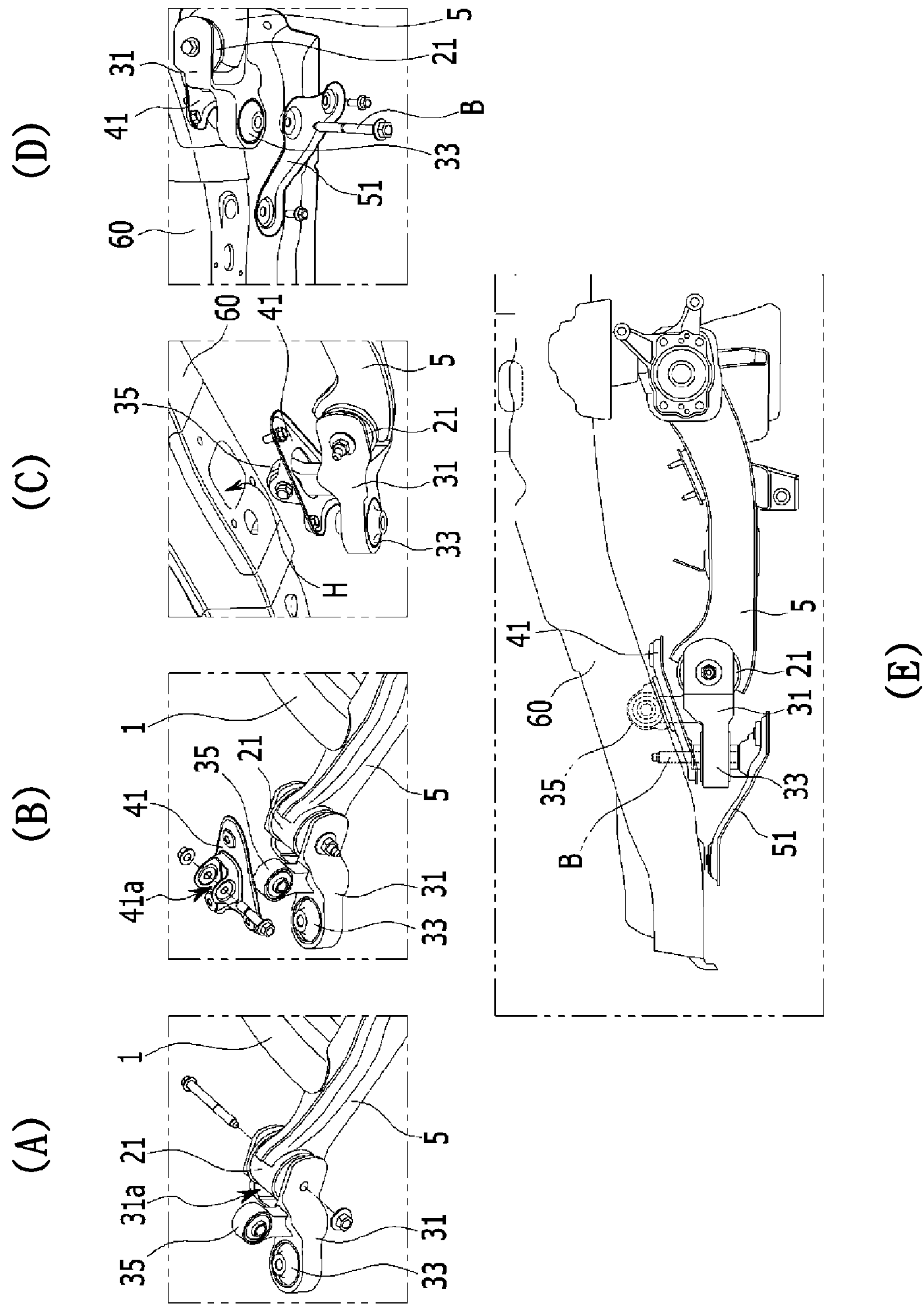
FIG. 5, including

FIG. 5, including FIGS. 5A-5E, is a drawing showing assembling process of a coupled torsion beam axle type suspension system according to various embodiments of the present invention. Referring to drawings, assembling processes for mounting the CTBA to the vehicle body, such as the side member 60 will be discussed.

The trailing arm bush 21 is inserted into the pocket portion 31*a* of the mounting link 31 and is engaged with a bolt in the width direction of a vehicle (FIG. 5A), and the upper mounting bush 35 of the mounting link 31 is inserted into the pocket portion 41*a* of the adapter 41 and is engaged with a bolt in the width direction of a vehicle (FIG. 5B).

The upper mounting bush 35 engaged within the pocket portion 41*a* of the adapter 41 is inserted into a hole H formed to the lower portion of the side member 60, and the adapter 41 is connected to the side member 60 by bolting at 3 points for example (FIG. 5C).

At the state that the upper mounting bush 35 is mounted to the side member 6 using the adapter 41, the stay 51 is disposed under the rotation mounting bush 33 for engaging the rotation mounting bush 33 to the lower portion of the side member 60 using a bush bolt B (FIG. 5D), and then the front end and the outer end of the stay 51 is connected to the side member 60 by bolting (FIG. 5E).

Since the rotation mounting bush 33 is interposed between the stay 51 and the vehicle body (the side member 60), engaging strength (engaging rigidity) of the CTBA may be enhanced.

Since the CTBA according to various embodiments of the present invention is provided with the adapter 41 and the stay 51 for the mounting upper mounting bush 35 and the rotation mounting bush 33, advantages including follows may be expected.

The applied adapter 41 may allow the mounting link 31 to be assembled to the CTBA at a time as a suspension module so that assemble characteristic may be improved, and strength or rigidity of the mounting portion of the side member 60 to the upper mounting bush 35 may be enhanced.

Since the stay 51 connects the mounting portion of the rotation mounting bush 33 and the side member 60, connection strength or connection rigidity form mounting the rotation mounting bush 33 may be enhanced. Thus, load input point of the rotation mounting bush 33 where particularly strength or rigidity is required may be reinforced.

For convenience in explanation and accurate definition in the appended claims, the terms "upper" or "lower", "front" or "rear", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle type suspension system (CTBA), comprising:
trailing arms respectively coupled to opposite ends of a torsion beam; and
vehicle body-engaging units, each provided in a front end portion of a respective trailing arm and engaging the respective trailing arm to a vehicle body, wherein
each vehicle body-engaging unit includes:
a trailing arm bush that is coupled to a front end portion of the respective trailing arm;
a mounting link disposed in front of the trailing arm bush and engaged thereto in a width direction of a vehicle;
a rotation mounting bush disposed in front of and outside of the respective trailing arm in the width direction of the vehicle, engaged to a front end of the mounting link, and engaged with a lower part of the vehicle body in a height direction of the vehicle;
an upper mounting bush connected to a protrude portion protruded from the mounting link between the rotation mounting bush and the respective trailing arm;
an adapter where the upper mounting bush is inserted therein and engaged to the lower part of the vehicle body; and
a stay engaged to the rotation mounting bush through a bush bolt under the rotation mounting bush and connected to the vehicle body.

2. The system of claim 1, wherein a first pocket portion is formed to a rearward of the mounting link for the respective trailing arm bush to be inserted and to be engaged therein.

3. The system of claim 1, wherein:
an intersection of extending lines that pass centers of the rotation mounting bushes and the trailing arm bushes forms an instantaneous rotational center point of the CTBA; and
the instantaneous rotational center point of the CTBA is positioned behind wheel centers.

4. The system of claim 1, wherein the vehicle body is a side member.

5. The system of claim 1, wherein a second pocket portion is formed to the adapter for the upper mounting bush to be inserted and to be engaged therein.

6. The system of claim 5, wherein:
the second pocket portion of the adapter is protruded upward; and
the upper mounting bush is disposed within the vehicle body and is supported by the adapter.

7. The system of claim 1, wherein the rotation mounting bush is disposed between the stay and the vehicle body.

8. A coupled torsion beam axle type suspension system (CTBA), comprising:
trailing arms respectively coupled to opposite ends of a torsion beam; and
vehicle body-engaging units, each provided in a front end portion of a respective trailing arm and engaging the respective trailing arm to a vehicle body, wherein
each vehicle body-engaging unit includes:
a trailing arm bush that is coupled to a front end portion of the respective trailing arm;
a mounting link where a first pocket portion is formed to a rearward thereof for the trailing arm bush to be inserted and to be engaged therein, an upper mounting bush connected to a protrude portion protruded therefrom, and a rotation mounting bush disposed in front and outside thereof in a width direction of the vehicle;
an adapter where the upper mounting bush is inserted therein and engaged to a lower part of the vehicle body through the upper mounting bush in the width direction of the vehicle body; and
a stay engaged to the rotation mounting bush through a bush bolt under the rotation mounting bush and connected to the vehicle body.

9. The system of claim 8, wherein the mounting link is engaged to the trailing arm bush through the first pocket portion in the width direction of the vehicle.

10. The system of claim 8, wherein the rotation mounting bush is engaged with the lower part of the vehicle body in a height direction of the vehicle.

11. The system of claim 8, wherein the upper mounting bush is disposed within the vehicle body and is engaged with the vehicle body in the width direction of the vehicle.

12. The system of claim 8, wherein:
an intersection of extending lines that pass centers of the rotation mounting bushes and the trailing arm bushes forms an instantaneous rotational center point of the CTBA; and
the instantaneous rotational center point of the CTBA is positioned behind wheel centers.

13. The system of claim 8, wherein the vehicle body is a side member.

14. The system of claim 8, wherein a second pocket portion is formed to the adapter for the upper mounting bush to be inserted and to be engaged therein.

15. The system of claim 14, wherein:
the second pocket portion of the adapter is protruded upward; and
the upper mounting bush is disposed within the vehicle body and is supported by the adapter.

16. The system of claim 8, wherein the rotation mounting bush is disposed between the stay and the vehicle body.

* * * * *